No. 834,231. PATENTED OCT. 23, 1906.
V. W. BLANCHARD.
COOKING OVEN.
APPLICATION FILED JAN. 22, 1906.

Witnesses
Inventor
Virgil W. Blanchard
By Alexander & Dowell
Attorneys

UNITED STATES PATENT OFFICE.

VIRGIL W. BLANCHARD, OF NEW YORK, N. Y.

COOKING-OVEN.

No. 834,231.   Specification of Letters Patent.   Patented Oct. 23, 1906.

Application filed January 22, 1906. Serial No. 297,281.

*To all whom it may concern:*

Be it known that I, VIRGIL W. BLANCHARD, of New York, in the county of New York and State of New York, have invented certain new and useful Improvements in Cooking-Ovens; and I hereby declare that the following is a full, clear, and exact description thereof, reference being had to the accompanying drawings, which form part of this specification.

This invention is an improvement in cooking-ovens, especially designed for gaseous fuel-burning stoves, and more particularly is designed for use in ranges of large capacity.

The object of the present invention is to provide an oven which can be located above the heat-generating portion of the apparatus and heated by means of the hot gases supplied directly therefrom at the will of the operator and to construct this oven with a plurality of heating-chambers in each of which heated gases may be directly admitted when desired to have the same very hot, as when cooking operations are being performed therein, and which also can be indirectly heated by heat supplied from adjacent chambers and by an internal heating-chamber.

By this apparatus articles requiring different temperatures for cooking can be simultaneously cooked in the different compartments of the oven, if desired, or one or more of the compartments can be used for warming-ovens, while others are used for baking purposes, and when used in large ranges the chef operating upon any one of the cooking-ranges of the apparatus can have convenient access to one of the compartments of the oven adjacent to such range and use the same for cooking operations without interfering with or being interfered with by other chefs cooking on the other range portions of the apparatus.

The device will be fully understood from the following description and the accompanying drawings, in which—

Figure 1:
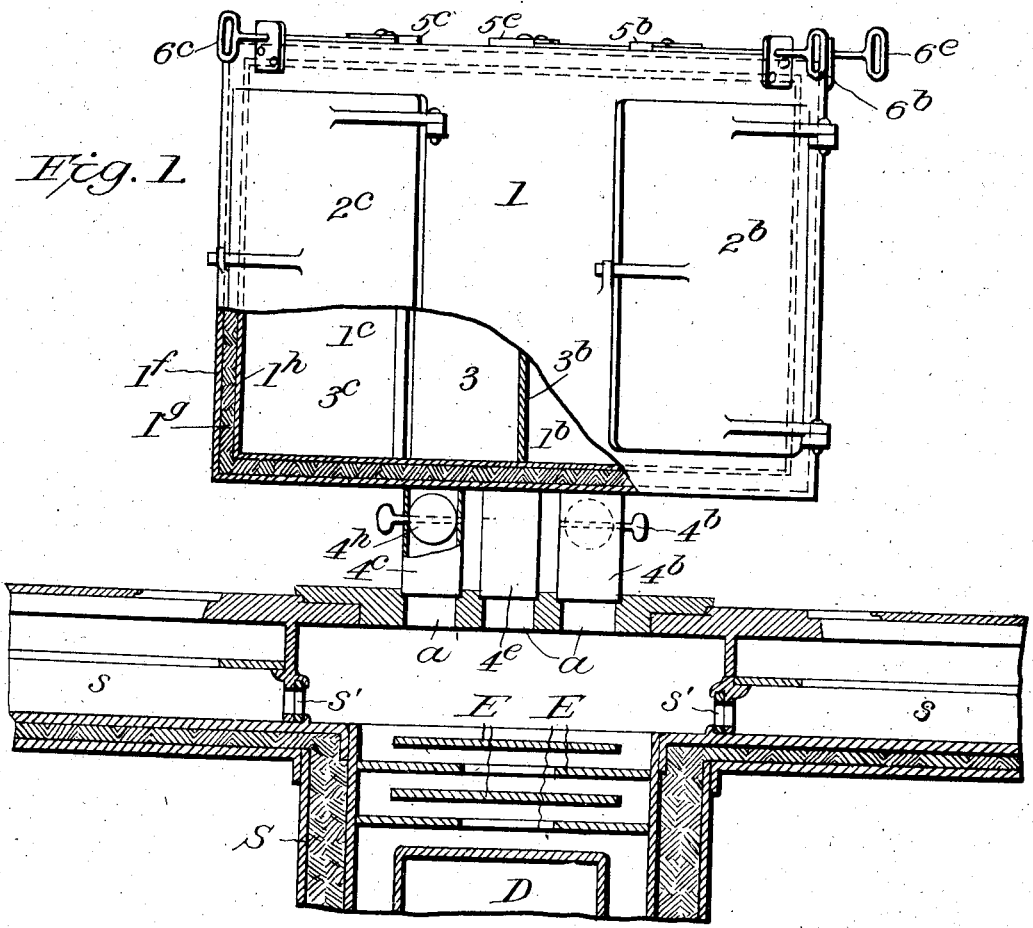
Figure 2:
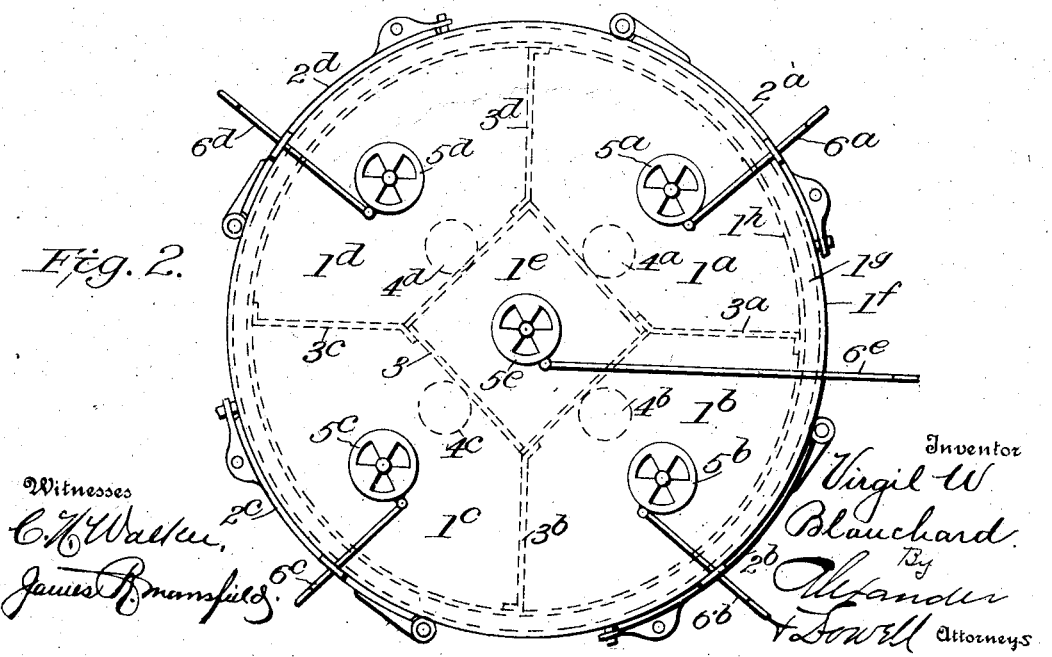

Figure 1 is a part side elevation and part section of the complete oven as applied to one of my cooking-ranges, and Fig. 2 is a top plan view of the oven.

In the drawings the gas-burning cooking-range shown is preferably constructed with a central portion S, in which the heated gases are produced, and a series of horizontally-arranged range-sections $s$, which communicate with the upper part of stove S and preferably radiate in different directions, so that a series of these ranges can be heated from the one generating apparatus, and preferably the heat may be directed into any of the range portions by means of valves $s'$.

The burner (not shown) discharges the hot gases into a hood D, above which are a series of alternating plates E and E', by which the hot gases are constrained to move inwardly and outwardly as they rise above the dome and are thoroughly oxidized, said dome and plates forming a highly-heated mass of metal in the center of the stove and insuring the thorough combustion of all the gases.

In the top of stove S above the burner are a series of openings $a$, which may be covered by suitable lids when the heating-oven, hereinafter described, is not in position.

The parts thus far described may be of any preferred construction and are not essential features of the present invention.

Above the stove is arranged a heating-oven, which, as shown, is preferably cylindrical in shape and is divided into a series of compartments, one for each range extension of the stove, and, as shown, there are four such compartments $1^a$ $1^b$ $1^c$ $1^d$, to which access can be had from the exterior of the oven through openings in the sides thereof, closed by doors $2^a$ $2^b$ $2^c$ $2^d$. Preferably the doors $2^a$ $2^b$ $2^c$ $2^d$ are interiorly lined with non-heat-conducting packing like the exterior walls of the oven, so as to retain as much heat as possible within the oven.

I preferably also form within the oven a closed compartment $1^e$, that may be formed by a metal casing 3, which, as shown, is rectangular in cross-section and from which casing radiate partitions $3^a$ $3^b$ $3^c$ $3^d$, which divide the remaining space in the oven into the compartments $1^a$ $1^b$ $1^c$ $1^d$.

Preferably the outer walls of the oven are composed of outer layers $1^f$ and inner layers $1^h$, the space between said layers being filled with non-heat-conducting material $1^g$, so as to prevent loss of heat by radiation or conduction. The bottom and top walls of the oven may be similarly formed.

The hot gases can be admitted into the lower end of each chamber or compartment $1^a$ $1^b$ $1^c$ $1^d$ $1^e$ through pipes $4^a$ $4^b$ $4^c$ $4^d$ $4^e$, which connect with openings $a$ in the top of stove S, as shown. Each pipe may be provided with a valve $4^h$, so that the passage of hot gases to each compartment is controllable. These pipes $4^a$ $4^b$ $4^c$ $4^d$ $4^e$ form convenient supports to sustain the oven in position upon the stove and can be removed with the oven if it is desired to remove the latter from the stove. In the upper ends of each compartment is an opening closable by a valve $5^a$ $5^b$ $5^c$ $5^d$ $5^e$, which can be operated by pull-rods $6^a$ $6^b$ $6^c$ $6^d$ $6^e$, as indicated in the drawings.

When gases are admitted into any compartment, the upper valve therein may be opened to permit more or less rapid circulation of heat through the compartment.

By this construction it is obvious that a chef operating upon any of the range extensions has an oven at hand and can easily regulate the temperature thereof to suit himself, and when it is not desired to use this oven for cooking purposes the inner and outer valves thereto can be closed and the oven kept at a sufficient temperature by means of the heat radiated from the inner chamber $1^e$. I propose in practice to make the walls of the oven sufficiently thick to store a large amount of heat therein to enable cooking operations to be performed in the compartments by the accumulated heat instead of by direct heat of the gases. Obviously by means of the valves the temperatures in the several compartments can be regulated and varied to suit the chefs and the character of the food being cooked therein.

Having thus described my invention, what I claim as new, and desire to secure by Letters Patent, is—

1. In combination with a gas heating-stove, an oven above the same provided with a series of radially-arranged compartments, pipes for conducting hot gases from the stove directly into the respective compartments, and valves in said pipes.

2. The combination of a gas heating-stove, an oven above the same provided with a series of radially-arranged compartments, pipes for conducting hot gases from the stove directly into the respective compartments, openings in the upper ends of the compartment, valves for closing said openings, and doors in the sides of the compartments for admitting access thereto.

In testimony that I claim the foregoing as my own I affix my signature in presence of two witnesses.

VIRGIL W. BLANCHARD.

In presence of—
 JAMES R. MANSFIELD,
 L. E. WITHAM.